(12) United States Patent
Willemain et al.

(10) Patent No.: US 11,977,925 B2
(45) Date of Patent: May 7, 2024

(54) CLUSTERING AND VISUALIZING DEMAND PROFILES OF RESOURCES

(71) Applicant: Smart Software, Inc., Belmont, MA (US)

(72) Inventors: Thomas Reed Willemain, Niskayuna, NY (US); Nelson Seth Hartunian, Belmont, MA (US)

(73) Assignee: Smart Software, Inc., Belmont, MA (US)

( * ) Notice: Subject to any disclaimer, the term of this patent is extended or adjusted under 35 U.S.C. 154(b) by 434 days.

(21) Appl. No.: 17/386,671

(22) Filed: Jul. 28, 2021

(65) Prior Publication Data

US 2022/0043691 A1    Feb. 10, 2022

Related U.S. Application Data

(60) Provisional application No. 63/060,744, filed on Aug. 4, 2020.

(51) Int. Cl.
*G06F 9/50* (2006.01)
*G06F 18/23213* (2023.01)

(52) U.S. Cl.
CPC .......... *G06F 9/5072* (2013.01); *G06F 9/5027* (2013.01); *G06F 9/5077* (2013.01); *G06F 18/23213* (2023.01)

(58) Field of Classification Search
None
See application file for complete search history.

(56) References Cited

U.S. PATENT DOCUMENTS

| | | | | |
|---|---|---|---|---|
| 8,989,910 | B1 * | 3/2015 | Klots | G06Q 50/06 702/179 |
| 2015/0161233 | A1 * | 6/2015 | Flora | G06F 16/285 707/737 |
| 2016/0042049 | A1 * | 2/2016 | Shilts | G06Q 50/06 707/603 |
| 2016/0364467 | A1 * | 12/2016 | Gupta | G06F 16/285 |
| 2016/0378847 | A1 * | 12/2016 | Byrnes | G06F 16/93 707/739 |

FOREIGN PATENT DOCUMENTS

| | | | | |
|---|---|---|---|---|
| CN | 104063480 A | * | 9/2014 | G06F 16/35 |
| CN | 109272258 A | * | 1/2019 | G06Q 10/0639 |

\* cited by examiner

*Primary Examiner* — Charles E Anya
(74) *Attorney, Agent, or Firm* — Hoffman Warnick LLC

(57) ABSTRACT

A system and method are presented for processing demand data for a set of resources in a technology platform. A method is provided that includes collecting demand profiles for the set of resources; reformatting each demand profile into a cumulative demand plot; calculating a distance metric for each pair of cumulative demand plots based on an area between the pair of cumulative demand plots; clustering the resources into a set of clusters based on calculated distance metrics; and generating a characterization for each of the clusters to facilitate management or control of the technology platform.

19 Claims, 7 Drawing Sheets

& 1

CLUSTERING AND VISUALIZING DEMAND PROFILES OF RESOURCES

BACKGROUND OF THE DISCLOSURE

Technical Field

The invention relates generally to processing demand information of resources in a technology platform, and more particularly to clustering and visualizing demand profiles to effectively manage and control a technology platform.

Background

There exist numerous technology platforms in which demand information associated with large numbers of resources is captured, processed, and fed back to improve the operation of the platform. Illustrative platforms and their associated resources may for example include: distributed computational systems having resources such as cloud based processors, memory and hardware resources; web resources on the Internet; communication infrastructures having resources such as switches, cell towers, routers; software resources; autonomous systems such as self-driving vehicles, robots and drones; Internet of Things (IoT) platforms; energy management systems having resources such as solar cells and windmills; inventory control systems; enterprise resource planning (ERP) systems, etc. In some instances, the number of different resources being managed within the platform may be tens or hundreds of thousands. Because the demand profiles of individual resources in such a platform can vary greatly, effectively utilizing the demand data to manage and control the platform remains an ongoing challenge.

SUMMARY

A system, method and program product are disclosed for processing demand data associated with a set of resources in a technology platform. In one aspect, a resource demand processing system is provided that includes: a memory; and a processor coupled to the memory and configured to process demand data for a set of resources according to a method that includes: inputting demand profiles for the set of resources from a technology platform; reformatting each demand profile into a cumulative demand plot; calculating a distance metric for each pair of cumulative demand plots based on an area between the pair of cumulative demand plots; clustering the resources into a set of homogeneous groups or clusters based on calculated distance metrics; and generating a visualization of each cluster.

In a further aspect, a method for processing demand data for a set of resources in a technology platform is provide that includes: collecting demand profiles for the set of resources; reformatting each demand profile into a cumulative demand plot; calculating a distance metric for each pair of cumulative demand plots based on an area between the pair of cumulative demand plots; clustering the resources into a set of clusters based on calculated distance metrics; and generating a characterization for each of the clusters to facilitate management or control of the technology platform.

In various aspects, a system is provided that accepts as input observations on the demand for a plurality of resources, determines a set of clusters having similar demand profiles, generates visualization depicting those clusters, and characterizes the clusters for a particular technology domain, e.g., with metatags and attributes. The clusters are formed by any clustering method such as k-means or cutting a dendrogram formed by agglomerative clustering. The clustering calculations use an inter-resource distance metric based on the total area between the normalized cumulative demand distributions of pairs of resources.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1:
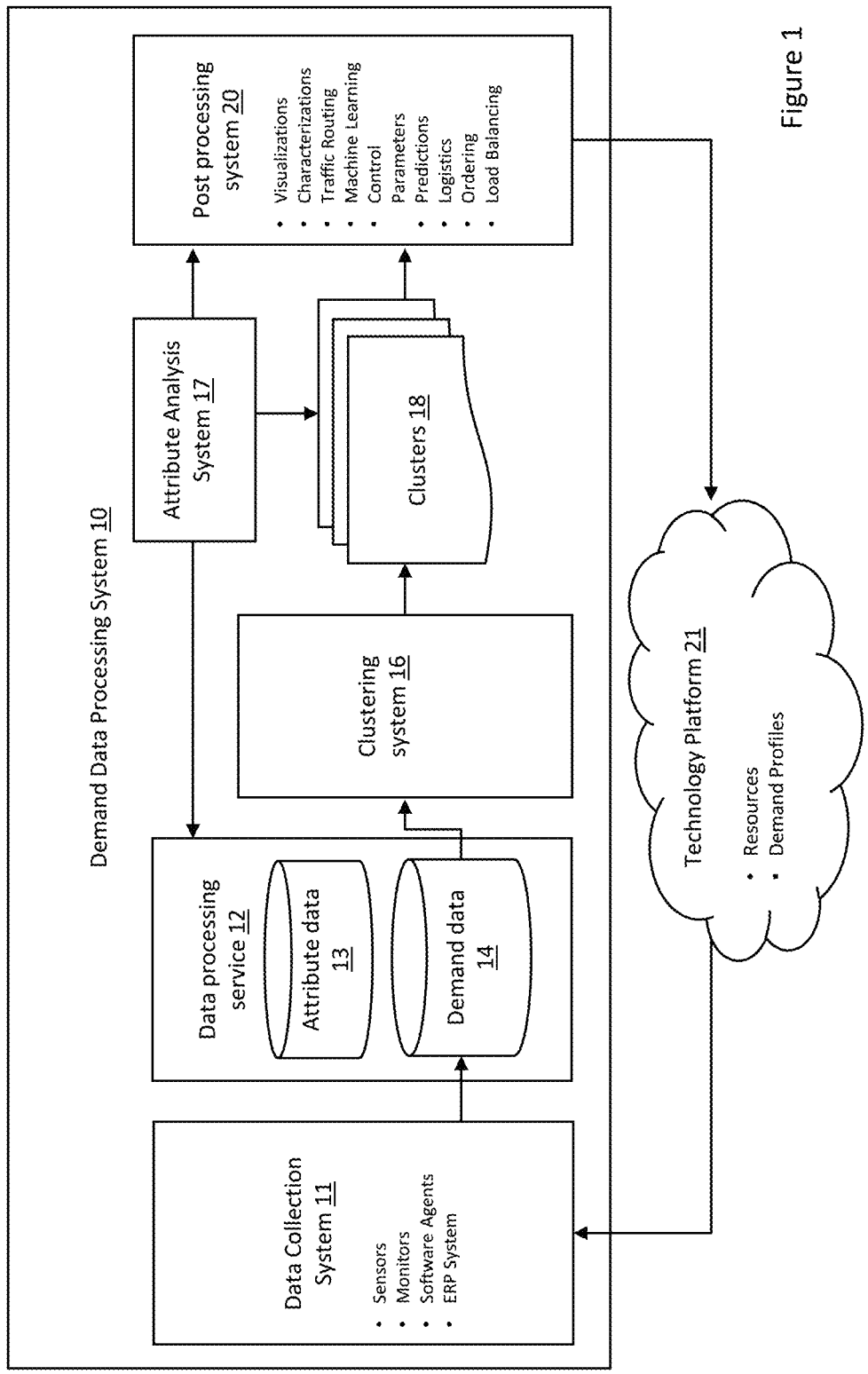
FIG. 1 depicts a demand data processing system in accordance with an embodiment of the invention.

The drawings are intended to depict only typical aspects of the disclosure, and therefore should not be considered as limiting the scope of the disclosure.

DETAILED DESCRIPTION OF THE DISCLOSURE

Aspects of the present invention provide technical solutions for clustering and visualizing demand profiles of resources to facilitate control and management of a technology platform. In any platform involving large numbers of resources, understanding the demand for such resources is critical in managing and/or controlling the platform. When the number of unique resources totals in the tens or hundreds of thousands, significant technical challenges arise in effectively utilizing the demand data to, e.g., load balance, set control parameters, plan for future needs, make decisions, etc. In particular, making use of large amounts of disparate demand information at scale remains a significant technical challenge in any domain. For example, in a distributed computing platform with thousands of virtual and physical components, each having a unique demand profile being generated continuously over time, implementing strategies to deploy and/or load balance components based on demand profiles to most effectively implement the system going forward is a significant challenge. Embodiments disclosed herein provide a technical solution to the aforementioned technical challenges by generating clusters and visualizations of demand data that can then be viewed and deployed to more effectively manage and control technology platforms at scale.

Aspects of this invention include a system and method of processing demand data associated with a large set of disparate resources in a technology platform. In an illustrative embodiment, resources are clustered into a small number of groups whose members share a similar demand pattern. Once clustered, demand patterns for each cluster can be utilized in an appropriate manner to facilitate control or management of the platform. For instance, a generalized demand pattern for each generated cluster might first be characterized, e.g., with a mathematical representation such as a median curve and/or with metatags, e.g., "trending up", "seasonal", "dwindling away" or "exploding." Once characterized, the clusters can be further processed by a post processing system, including, e.g., displaying clusters on an interactive graphical user interface, analyzing clusters with a machine learning algorithm to create control parameters, generating predictions or recommendations, etc. For example, load balancing recommendations may be generated in which resources in the "dwindling away" cluster are grouped with resources in an "exploding" cluster. Alternatively, resources in the "dwindling away" cluster might be assigned additional support (e.g., bandwidth increases, increased training, marketing support, etc.) to restore their contribution to the platform.

It is understood that the invention could be utilized to process and manage any type of demand data involving disparate resources having unique demand patterns. Accordingly, resources could for example include, computing resources, energy consumers or producers, web resources, communication resources, physical or virtual components, autonomous vehicles, units of inventory, spare parts, stock keeping units (SKUs), etc. In some cases, the described approach could be utilized for analyzing demand of cloud computing resources, energy grid usage, communication resources, etc. In other cases, the approach could be utilized for enterprise ERP systems that process information to control inventory and manage supply chains, etc.

FIG. 1 depicts an illustrative demand data processor 10 for processing demand data 14 associated with a technology platform 21. Demand data 14 generally includes demand profiles of disparate resources collected by a data collection system 11. In various embodiments, data collection system 11 could for example use: sensors that collect real time data, e.g., water usage across a large geospace; monitors that observe cloud computing resources; software agents that control web traffic; ERP information that tracks SKUs in a supply chain, etc. Once collected, demand data 14 is stored and managed by a data processing service 12, such as database, a control system, an inventory management system, etc. In addition to demand data, data processing service 13 can also collect and store attribute data 13. Attribute data 13 may include any type of information associated with the resources of technology platform 21. Attribute data 13 may for example be obtained from the technology platform 21 itself, or a third-party source such as Web searches, social media postings, news broadcasts, etc. Attribute data 13 can be stored as structured or unstructured data.

Figure 2:
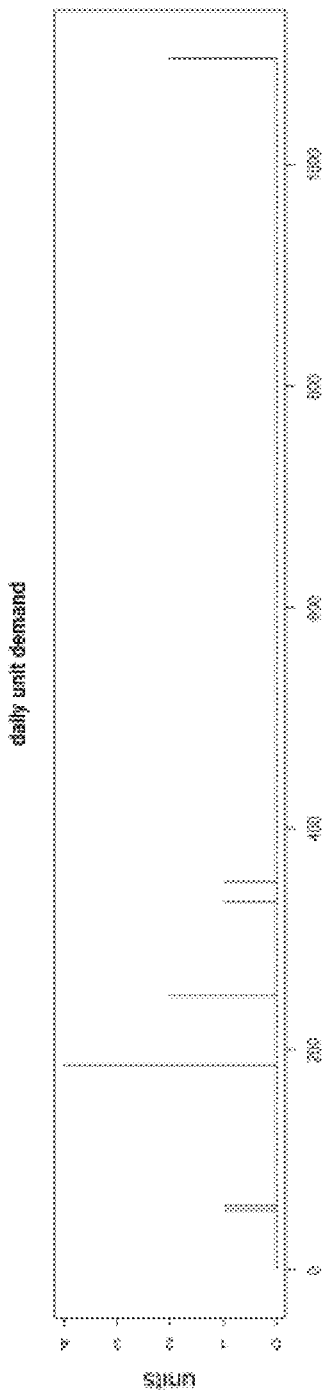
FIG. 2 shows daily demand for a resource with very intermittent demand.

FIG. 2 depicts an illustrative demand profile of a resource, in this case daily demand for a selected resource, which in this case has very intermittent demand. The vertical axis is demand in units, which may for example represent computer memory or processing usage, energy consumption, web searches, error or alarm conditions, sales, etc. The horizontal axis is time in days. This plot shows the demand data in raw form. In general, the time unit could be any repetitive period, e.g., hour, day, week, month, etc. In environments where demand for a large number of units is being tracked, e.g., 50,000 or more, determining which resources have related demand behavior can provide a significant technical value, e.g., to allow for the effective allocation of resources to address future demand. Clustering system 16 (FIG. 1) provides a technical solution that automatically and quickly groups plots such as those shown in FIG. 2 into a convenient number of clusters 18.

Once clusters 18 are generated, the clusters 18 can, for example, be further processed by post processing system 20. Post processing system 20 may for example include: generating visualizations, characterizing the different clusters with mathematical representations or with metatags (e.g., using artificial intelligence), associating clusters with attribute data 13, providing routing of traffic in a communication system or among autonomous vehicles, implementing control parameters, making predictions, performing logistics, ordering, load balancing, etc. In certain aspects, the post processed information can be fed back into the technology platform 21 to automatically manage or control the platform 21.

Figure 3:
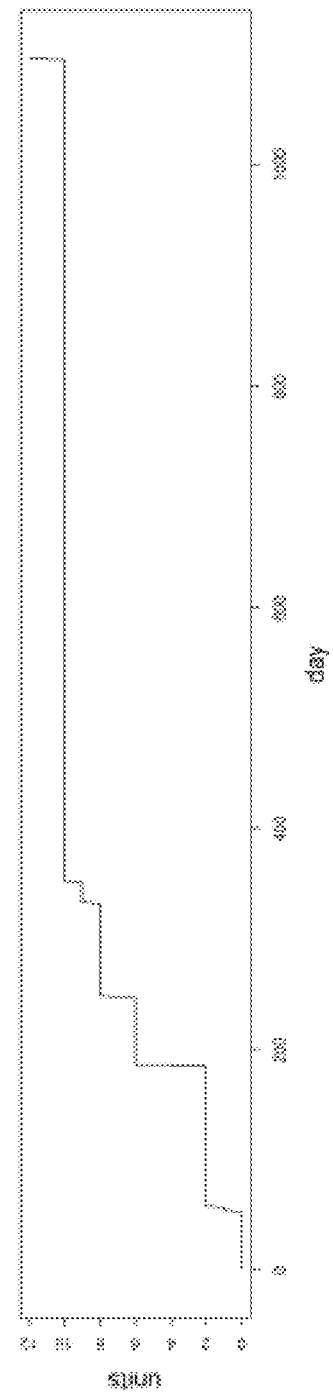
FIG. 3 shows the demand data in FIG. 2 reformatted into a plot of cumulative demand in accordance with an embodiment of the invention.
Figure 4:
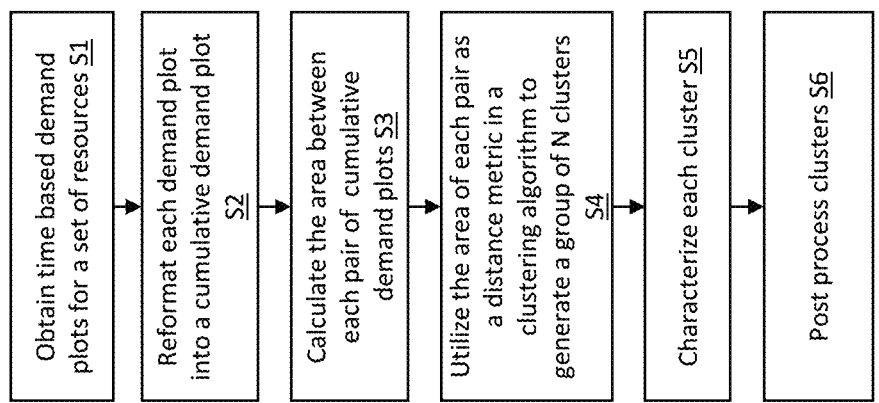
FIG. 4 depicts a flow diagram of a method for processing demand data in accordance with an embodiment of the invention.

FIG. 4 depicts a flow diagram of a process that utilizes demand data to manage and/or control a technology platform 21. At S1, time-based demand plots are obtained for a set of resources (such as that shown in FIG. 2). At S2, each demand plot is reformatted into a cumulative demand plot, such as that shown in FIG. 3, which tracks the total demand of the resource over time. While demand plots are shown as visual graphs for the purposes of describing the various embodiments, it is understood that term "plot" may refer to any data representation or format of time-based demand including, e.g., a table, a matrix, a data structure, a record, etc.

Figure 5:
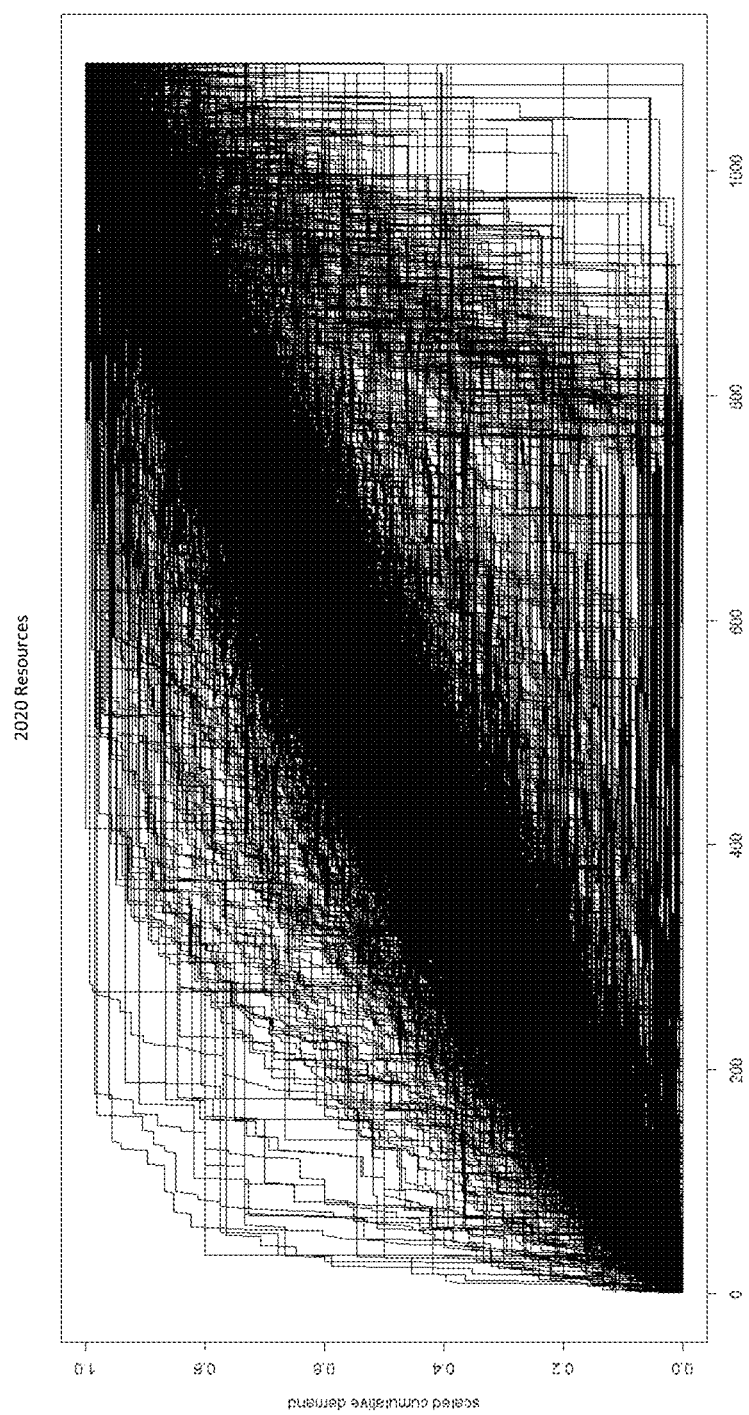
FIG. 5 shows the cumulative demand plots of a large set of items in accordance with an embodiment of the invention.
Figure 6:
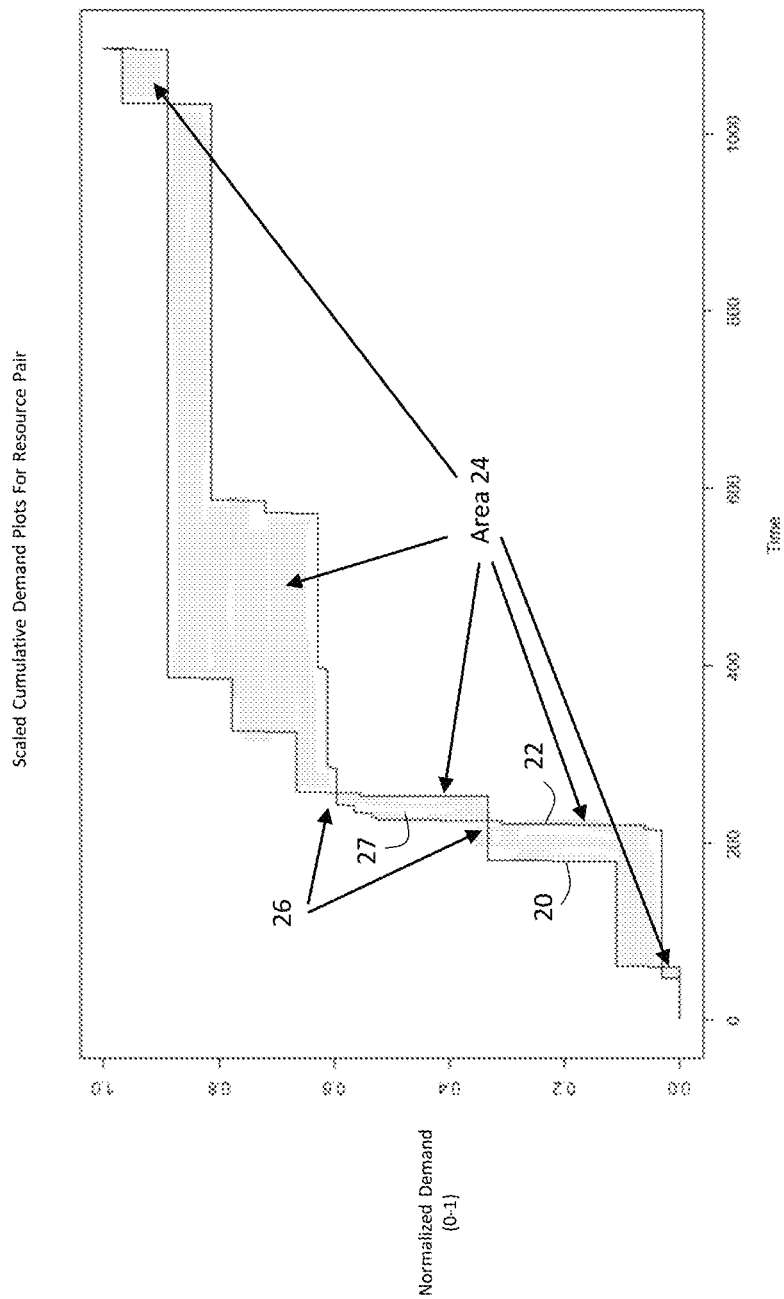
FIG. 6 shows cumulative demands for two resources in which the area between the two plots is highlighted in accordance with an embodiment of the invention.

FIG. 5 shows a visual representation of the cumulative demand plots of 2,080 resources being tracked for an illustrative platform 21. As is evident, without further processing, analyzing such large numbers of resources can be a challenge, i.e., it would be difficult for a person or automated process to simply look at the data and draw any conclusions about demand behavior. To address this, the plots are clustered into groups having common demand patterns using the following technique. First, at S3 (FIG. 4), the total area between each pair of cumulative demand plots is calculated, i.e., the process evaluates the area between each pair of cumulative demand plots for all resources in the platform 21. An illustrative example showing how the area 24 between the two plots 20, 22 is determined is shown in FIG. 6. Note that the area between the cumulative demand plots of pairs of resources may be normalized, i.e., to scale the cumulative demand to a range such as between zero and one to focus attention on shape rather than scale. The area between the two demand plots can be calculated in any manner. For example, in one illustrative embodiment, adjacent intersection points (e.g., points 26) where the two plots 20, 22 cross define sub-regions (e.g., sub-region 27). For each sub-region, the absolute value of the demand difference between the plots is calculated at each time period (e.g., day) and the differences are summed to provide a sub-region area. The sub-region areas for the entire plot are summed to provide the entire area 24.

Next, at S4, the total area 24 is then utilized as a distance metric in a clustering algorithm to generate a group of N clusters. Clustering requires a metric of "distance" (alternatively, "similarity") between the resources. If two resources have nearly identical daily demands, the two cumulative curves would nearly coincide, the area 24 between them would be small, and so they would be candidates for grouping into the same cluster. Conversely, if one resource had most of its demand very early in the time sequence and the other very late, the gap between the curves and hence the distance metric would be large, and the two items would belong in different clusters. In one illustrative embodiment, the distance metric is calculated as the cube (or some other power) of the area 24 between the two cumulative curves 20, 22. In certain aspects, cubing the area 24 is known (based on empirical testing) to generate superior results. However, it understood that any "area-based" value determined between two cumulative demand curves 20-22 can be used to establish the distance metric.

Figure 7:
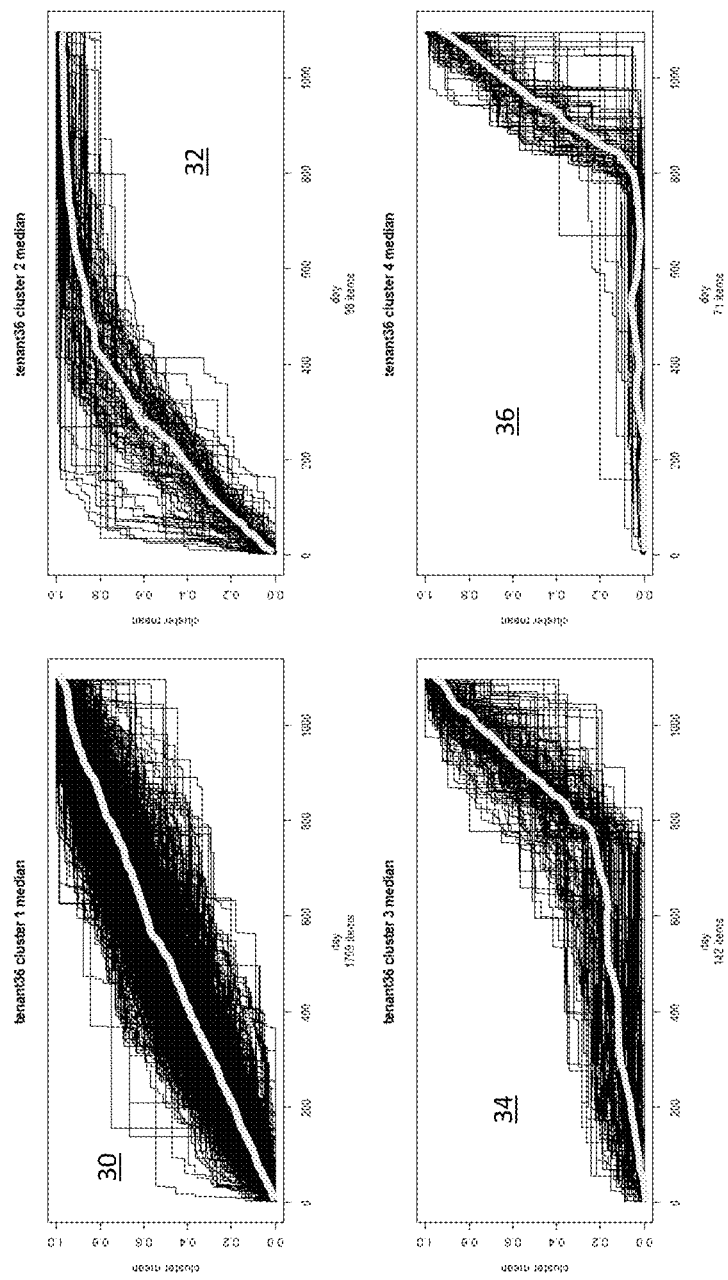
FIG. 7 shows the cumulative demand plots of four resource clusters along with plots for each cluster showing the median cumulative demand for all resources in the cluster in accordance with an embodiment of the invention.

Clusters may be generated in any manner from the distance metric. For instance, FIG. 7 depicts four clusters generated from the FIG. 4 data formed using k-means clustering. However, any suitable clustering method could be utilized, e.g., a machine learning method such as k-means clustering, random forests, classification and regression (CART) trees, neural nets, or cutting a dendrogram formed by agglomerative clustering. The individual plots in each visualization are indicative of the degree of homogeneity within each cluster; while some resources drift away from the median cumulative demand, by construction each resource is closer to the other resources in its own cluster than to any item in any other cluster.

The number of clusters N may be selected in any manner, e.g., the choice of the user or automatically selected by the system. In certain implementations, the number of clusters N may range from two to eight, depending on the number of unique resource and their degree of homogeneity.

At S5, once generated, each cluster can be characterized in any manner. For example, as shown in FIG. 7, each cluster can be mathematically characterized by the thick central line which shows the median cumulative demand curve for all resources in the cluster, which is useful for characterizing the cluster's overall demand profile. Each cluster may be further characterized with metatags that describe each cluster with, e.g., natural language (NL) semantics. For example, as shown in FIG. 7, cluster 30 might be characterized with the metatag "steady", cluster 32 as "dying", cluster 34 as "rejuvenated", and cluster 36 as "exploding."

At S6, the clusters may be post processed in any manner. For example, the clusters can be displayed on an interactive graphical user interface, analyzed with a machine learning algorithm, e.g., to output recommendations, etc. In one illustrative embodiment, the clusters can be fed back into the platform to provide load balancing, inventory planning, marketing strategies, pricing plans, etc. In the case where the generated clusters are output as visualizations, e.g., on a graphical user interface or the like, the visualizations may be interactive in nature, allowing the user to select, further cluster, and/or subdivide a given cluster.

In certain embodiments, the metatags can be generated automatically by the post processing system 20. In one approach, the demand curve for each cluster can be inputted into a machine learning model, which analyzes each curve and outputs the metatags. On other cases, a machine learning model can output recommendations, predictions, control parameters, etc. The machine learning model may for instance be trained on historical demand curves, how the curves were characterized in the past, types of future outcomes that occurred, etc. In various embodiments, the generated results of the post processing system 20 can be fed back and utilized by the technology platform 21 to automatically manage and control the platform 21.

Further, as shown in FIG. 1, an attribute analysis system 17 may be deployed to correlate attribute data 13 with the clusters 18 to further enhance the operational significance and understanding of membership in a given cluster 18. In certain embodiments, the attribute data 13 associated with each cluster can be compared, e.g., using a chi-square test to identify any significant differences between clusters. Correlating attribute data to clusters 18 accordingly facilitates understanding of what it means for a resource to be a member of a given cluster.

For instance, in an illustrative embodiment, based on attribute analysis, it may be determined that resources in a first cluster may be more likely to be used in a business-to-business role, whereas resources in a second cluster may be more likely used in a business to consumer role. In other examples, correlation of attribute data 13 may reveal: that the majority of resources in one cluster comprise virtual computing resources in west coast data centers; that a cluster involves Web traffic collected during non-peak hours; that a cluster may primarily include SKUs spare parts for helicopter engines; that a cluster may involve a high number of components made of low-strength aluminum, etc. In still other examples, a cluster of SKUs for spare parts might be characterized by the percentage of its members in each of several storage locations or even locations within a storage structure. In such a case, automatic retrieval systems within a warehouse could be made more efficient by co-locating items with similar demand patterns. As yet another example, resources clustered by declining sales might have their prices adjusted automatically on-line in based on their recent sales activity.

Figure 8:
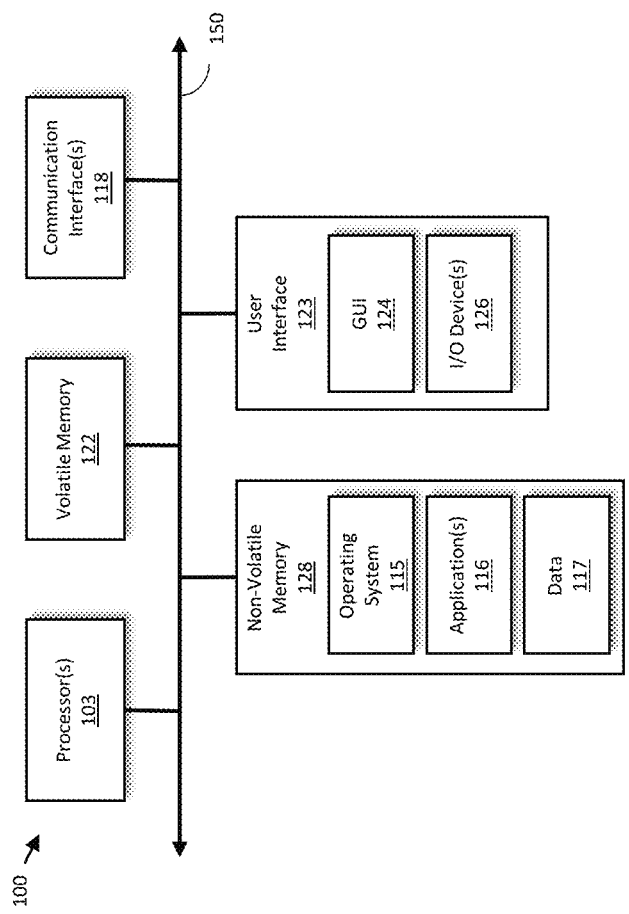
FIG. 8 shows a computing system configured to implement aspects of the demand data processing system in accordance with an embodiment of the invention.

FIG. 8 depicts a block diagram of a computing device 100 useful for practicing an embodiment of demand data processing system 10. The computing device 100 includes one or more processors 103, volatile memory 122 (e.g., random access memory (RAM)), non-volatile memory 128, user interface (UI) 123, one or more communications interfaces 118, and a communications bus 150.

The non-volatile memory 128 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 123 may include a graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, and one or more accelerometers, etc.).

The non-volatile memory 128 stores an operating system 115, one or more applications 116, and data 117 such that, for example, computer instructions of the operating system 115 and/or the applications 116 are executed by processor(s) 103 out of the volatile memory 122. In some embodiments, the volatile memory 122 may include one or more types of RAM and/or a cache memory that may offer a faster response time than a main memory. Data may be entered using an input device of the GUI 124 or received from the I/O device(s) 126. Various elements of the computer 100 may communicate via the communications bus 150.

The illustrated computing device 100 is shown merely as an example client device or server and may be implemented by any computing or processing environment with any type of machine or set of machines that may have suitable hardware and/or software capable of operating as described herein.

The processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

In some embodiments, the processor 103 may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 118 may include one or more interfaces to enable the computing device 100 to access a computer network such as a Local Area Network (LAN), a Wide Area Network (WAN), a Personal Area Network (PAN), or the Internet through a variety of wired and/or wireless connections, including cellular connections.

In described embodiments, the computing device 100 may execute an application on behalf of a user of a client device. For example, the computing device 100 may execute one or more virtual machines managed by a hypervisor. Each virtual machine may provide an execution session within which applications execute on behalf of a user or a client device, such as a hosted desktop session. The computing device 100 may also execute a terminal services session to provide a hosted desktop environment. The computing device 100 may provide access to a remote computing environment including one or more applications, one or more desktop applications, and one or more desktop sessions in which one or more applications may execute.

Having thus described several aspects of at least one embodiment, it is to be appreciated that various alterations, modifications, and improvements will readily occur to those skilled in the art. Such alterations, modifications, and improvements are intended to be part of this disclosure and are intended to be within the spirit and scope of the disclosure. Accordingly, the foregoing description and drawings are by way of example only.

Various aspects of the present disclosure may be used alone, in combination, or in a variety of arrangements not specifically discussed in the embodiments described in the foregoing and is therefore not limited in this application to the details and arrangement of components set forth in the foregoing description or illustrated in the drawings. For example, aspects described in one embodiment may be combined in any manner with aspects described in other embodiments.

Also, the disclosed aspects may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The invention claimed is:

1. A resource demand processing system, comprising:
   a memory; and
   a processor coupled to the memory and configured to process demand data for a set of resources according to a method that includes:
   inputting demand profiles for the set of resources from a technology platform;
   reformatting each demand profile into a cumulative demand plot, wherein the cumulative demand plot for an associated resource provides a running sum of demand values for the associated resource over time;
   calculating a distance metric for each pair of cumulative demand plots based on an area between the pair of cumulative demand plots, wherein the area is calculated by evaluating a set of sub-regions defined by intersections points where the pair of cumulative demand plots cross;
   clustering the resources into a set of clusters based on calculated distance metrics; and
   generating a visualization of each cluster.

2. The system of claim 1, further comprising generating a mathematical characterization of each cluster.

3. The system of claim 2, further comprising automatically generating metatags for each cluster based on the mathematical characterization.

4. The system of claim 2, further comprising load balancing resources based on the mathematical characterizations.

5. The system of claim 2, further comprising analyzing the clusters with a machine learning model that outputs at least one of: metatags, control parameters, predictions, or recommendations.

6. The system of claim 1, wherein the resources are selected from a group consisting of: computing resources, energy resources, web resources, communication resources, physical or virtual components, autonomous vehicles, units of inventory, or Stock Keeping Unit (SKU) identifiers.

7. The system of claim 1, wherein cumulative demand plots are normalized to form normalized cumulative demand plots.

8. The system of claim 7, wherein the distance metric is calculated based on a power of the area between pairs of normalized cumulative demand plots.

9. The system of claim 1, wherein the clusters are generated using a machine learning method selected from a group consisting of: k-means clustering, random forests, classification and regression (CART) trees, neural nets, and cutting a dendrogram formed by agglomerative clustering.

10. A method for processing demand data for a set of resources in a technology platform, the method comprising:
    collecting demand profiles for the set of resources; reformatting each demand profile into a cumulative demand plot, wherein the cumulative demand plot for an associated resource provides a running sum of demand values for the associated resource over time;
    calculating a distance metric for each pair of cumulative demand plots based on an area between the pair of cumulative demand plots, wherein the area is calculated by evaluating a set of sub-regions defined by intersections points where the pair of cumulative demand plots cross;
    clustering the resources into a set of clusters based on calculated distance metrics; and generating a characterization for each of the clusters to facilitate management or control of the technology platform.

11. The method of claim 10, further comprising generating a visualization of each cluster on a graphical user interface.

12. The method of claim 10, wherein the characterization includes a mathematical characterization.

13. The method of claim 12, further comprising automatically generating metatags for each cluster based on the mathematical characterization.

14. The method of claim 12, further comprising load balancing resources in the technology platform based on the mathematical characterizations.

15. The method of claim 10, further comprising analyzing the clusters with a machine learning model that outputs at least one of: metatags, control parameters, predictions, or recommendations.

16. The method of claim 10, wherein the technology platform is selected from a group consisting of: a distributed computing platform, energy resources, web resources, communication resources, physical or virtual components, autonomous vehicles, units of inventory, or Stock Keeping Unit (SKU) identifiers.

17. The method of claim 10, wherein the resources are selected from a group consisting of: computing resources, energy resources, web resources, communication resources, physical or virtual components, autonomous vehicles, units of inventory, or Stock Keeping Unit (SKU) identifiers.

18. The method of claim 10, wherein cumulative demand plots are normalized to form normalized cumulative demand plots.

19. The method of claim 18, wherein the distance metric is calculated based on a power of the area between pairs of normalized cumulative demand plots.

* * * * *